United States Patent
Hsu et al.

(10) Patent No.: US 8,780,875 B2
(45) Date of Patent: Jul. 15, 2014

(54) METHOD AND APPARATUS FOR CONTROLLING DISCONTINUOUS TRANSMISSIONS

(75) Inventors: Liangchi Hsu, San Diego, CA (US);
Idreas Mir, San Diego, CA (US);
Srividhya Krishnamoorthy, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1076 days.

(21) Appl. No.: 12/133,747

(22) Filed: Jun. 5, 2008

(65) Prior Publication Data

US 2009/0303977 A1    Dec. 10, 2009

(51) Int. Cl.
*H04B 7/216* (2006.01)
*H04W 24/00* (2009.01)
*H04W 72/04* (2009.01)
*H04W 88/02* (2009.01)

(52) U.S. Cl.
CPC .......... *H04W 24/00* (2013.01); *H04W 72/0406* (2013.01); *H04W 72/04* (2013.01); *H04W 88/02* (2013.01)
USPC ........... 370/342; 370/328; 370/329; 370/338; 370/348; 455/456.6

(58) Field of Classification Search
None
See application file for complete search history.

(56) References Cited

U.S. PATENT DOCUMENTS

| | | | | |
|---|---|---|---|---|
| 7,773,951 B2 * | 8/2010 | Molnar et al. | ............. | 455/67.13 |
| 2006/0014543 A1 * | 1/2006 | Drakos | ......................... | 455/450 |
| 2007/0030829 A1 * | 2/2007 | Vimpari et al. | ................ | 370/335 |
| 2007/0047474 A1 * | 3/2007 | Anderson | ....................... | 370/277 |
| 2007/0133458 A1 * | 6/2007 | Chandra et al. | ................ | 370/329 |
| 2007/0189237 A1 | 8/2007 | Jaatinen et al. | | |
| 2008/0031193 A1 | 2/2008 | Laroia et al. | | |
| 2008/0043681 A1 * | 2/2008 | Vimpari et al. | ................ | 370/335 |
| 2008/0207150 A1 * | 8/2008 | Malladi et al. | .............. | 455/127.1 |
| 2008/0304448 A1 * | 12/2008 | Hosein | ........................... | 370/329 |
| 2009/0059841 A1 * | 3/2009 | Laroia et al. | .................. | 370/328 |

FOREIGN PATENT DOCUMENTS

| | | |
|---|---|---|
| JP | 2001128235 A | 5/2001 |
| WO | WO2007136337 | 11/2007 |
| WO | WO2008023225 | 2/2008 |

OTHER PUBLICATIONS

Ericsson: "Draft answer on liaison on power control preamble length" 3rd Generation Partnership Project (3GPP); Technicalspecification Group (TSG) Radio Access Network (RAN); W0RKING6ROUP 1 (WG1), XX, XX, vol. TSGR1#17(00)1422, Nov. 21, 2000, pp. 1-3, XP003018372 p. 1, l i ne 24-line 39 p. 2, line 24-line 38.

(Continued)

*Primary Examiner* — Ian N Moore
*Assistant Examiner* — Brain T Le
(74) *Attorney, Agent, or Firm* — William M. Hooks

(57) ABSTRACT

Techniques for controlling discontinuous transmissions in a wireless communication system are described. A method and apparatus for transmitting data on an uplink includes tracking past performance of at least one of an uplink channel condition and uplink system resources. A prediction of a likelihood of a completed or successful data transmission is performed. A long preamble is transmitted with an uplink control channel when the prediction indicates a likelihood of completion of the data transmission. When past performance indicates an unlikelihood of completing the transmission of the data, then the discontinuous mode is maintained without data transmission.

21 Claims, 5 Drawing Sheets

(56) References Cited

OTHER PUBLICATIONS

International Search Report & Written Opinion—PCT/US2009/046295, International Search Authority—European Patent Office—Oct. 13, 2009.
R1-071829_25214CR0438R1—Nokia et al: "Clarifications for CPC feature" 3GPP Draft; 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, XP050105734 [retrieved on Apr. 3, 2007] p. 6, line 1-p. 9, line 24.
Nokia: "UL gating preamble",3GPP TSG-RAN-WG2 Meeting #56bis, R2-070184, Jan. 15, 2007,pp. 1-2.
Taiwan Search Report—TW098118804—TIPO—Aug. 30, 2012.

* cited by examiner

METHOD AND APPARATUS FOR CONTROLLING DISCONTINUOUS TRANSMISSIONS

BACKGROUND

1. Field

The present disclosure relates generally to communications, and more specifically to techniques for transmitting and receiving discontinuous data in a wireless communication network.

2. Background

A wireless device (e.g., a cellular phone) in a wireless communication network may operate in one of several operating modes, such as active and idle, at any given moment. In the active mode, the wireless device may be allocated radio resources by the network and may actively exchange data with the network, e.g., for a voice or data call. In the idle mode, the wireless device may not be allocated radio resources and may be monitoring overhead channels transmitted by the network. The wireless device may transition between the active and idle modes, as necessary, based on data requirements of the wireless device. For example, the wireless device may transition to the active mode whenever there is data to send or receive and may transition to the idle mode after completing the data exchange with the network.

The wireless device may exchange signaling with the network to transition between operating modes. The signaling consumes network resources and consumes unnecessary power in the wireless device if the wireless device is transitioned to an operating mode only to be prevented from communicating data due to denial by the network resources.

There is therefore a need in the art for techniques to probabilistically determine whether a wireless device should transition from an idle to an active state.

SUMMARY

Techniques for controlling discontinuous transmissions in a wireless communication system are described herein. In one embodiment, a method of transmitting data on an uplink includes tracking past performance of at least one of an uplink channel condition and uplink system resources. A prediction of a likelihood of a completed or successful data transmission is performed. A long preamble is transmitted with an uplink control channel when the prediction exceeds a threshold.

In another embodiment, an apparatus for transmitting data on an uplink is disclosed. The apparatus includes at least one processor to track past performance of at least one of an uplink channel condition and uplink system resources. The processor is further configured to predict a likelihood of a completed data transmission based on the past performance. The apparatus further includes a transmitter to transmit a long preamble with an uplink control channel when the prediction exceeds a threshold.

Other embodiments include a means and processor-readable medium for performing a method of transmitting data on an uplink including tracking past performance of at least one of an uplink channel condition and uplink system resources and predicting a likelihood of a completed data transmission based on the past performance. A long preamble is then transmitted with an uplink control channel when the prediction exceeds a threshold.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as Code Division Multiple Access (CDMA) networks, Time Division Multiple Access (TDMA) networks, Frequency Division Multiple Access (FDMA) networks, and Orthogonal FDMA (OFDMA) networks. The terms "network" and "system" are often used interchangeably. A CDMA network may implement a radio technology such as W-CDMA, cdma2000, and so on. cdma2000 covers IS-2000, IS-856 and IS-95 standards. A TDMA network may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are described below for Universal Mobile Telecommunication System (UMTS), which utilizes W-CDMA. UMTS terminology is used in much of the description below.

Figure 1:
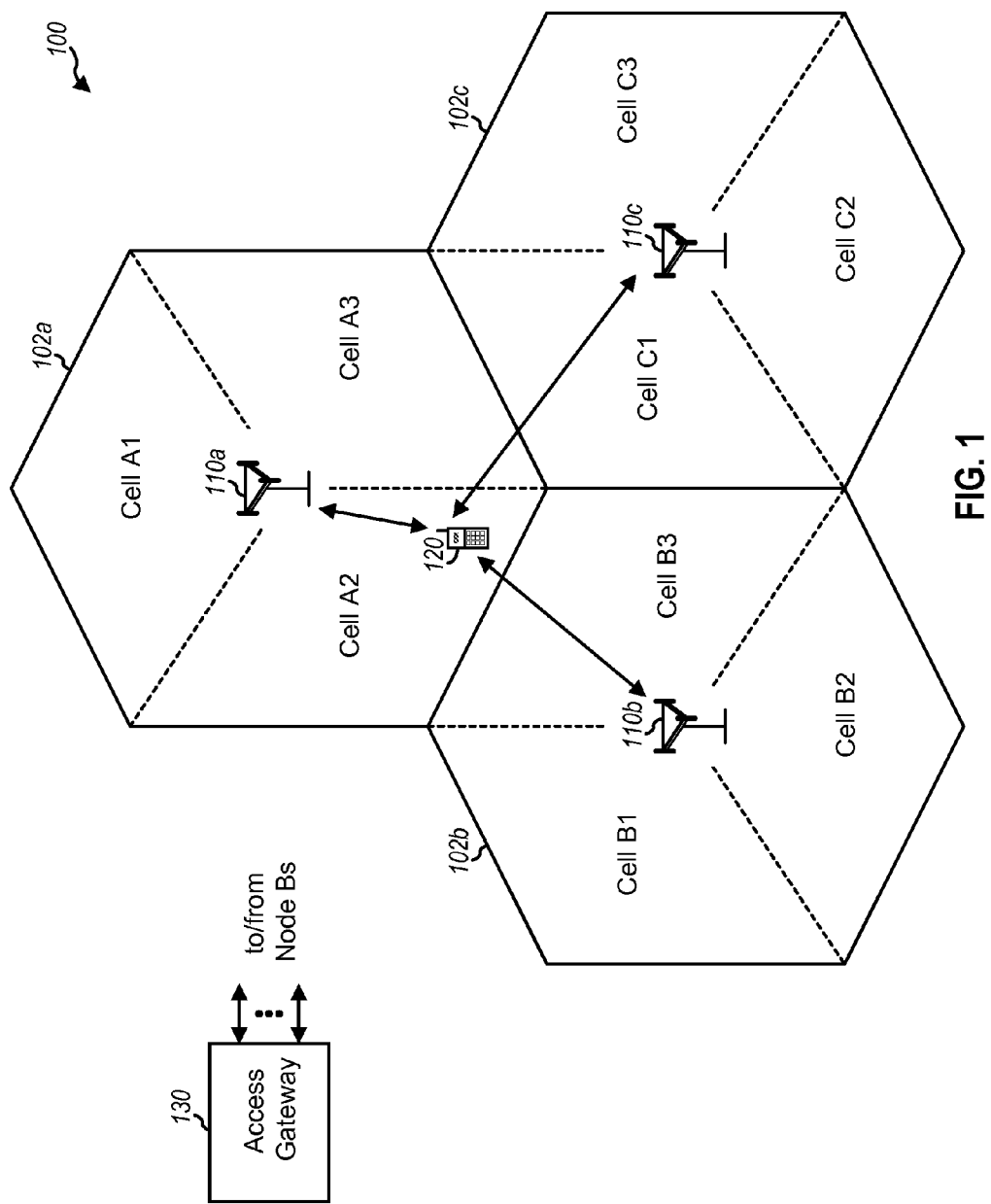
FIG. 1 illustrates a wireless communication network, in accordance with various embodiments.

FIG. 1 illustrates a wireless communication network 100, which may be a UMTS network. Wireless network 100 may also be referred to as a Universal Terrestrial Radio Access Network (UTRAN) in 3GPP. Wireless network 100 may include any number of Node Bs that support communication for any number of user equipments (UEs). For simplicity, only three Node Bs 110*a*, 110*b* and 110*c* and one UE 120 are shown in FIG. 1.

A Node B is generally a fixed station that communicates with the UEs and may also be referred to as an evolved Node B (eNode B), a base station, an access point, etc. Each Node B provides communication coverage for a particular geographic area and supports communication for the UEs located within the coverage area. The coverage area of a Node B may be partitioned into multiple (e.g., three) smaller areas, and each smaller area may be served by a respective Node B subsystem. The term "cell" can refer to the smallest coverage area of a Node B and/or the subsystem serving this coverage area, depending on the context in which the term is used. In the example shown in FIG. 1, Node B 110*a* serves cells A1, A2 and A3, Node B 110*b* serves cells B1, B2 and B3, and Node B 110*c* serves cells C1, C2 and C3. The Node Bs may be operated synchronously or asynchronously. For a synchronous network, the timing of the Node Bs may be aligned to a reference time (e.g., GPS time). For an asynchronous network, but the timing of the cells of each Node B may be aligned, but the timing of different Node Bs may not be aligned.

In general, any number of UEs may be dispersed throughout the wireless network, and each UE may either be stationary or mobile. UE 120 may also be referred to as a wireless device, a mobile station, a terminal, an access terminal, a subscriber unit, a station, etc. UE 120 may be a cellular phone, a personal digital assistant (PDA), a wireless device, a handheld device, a wireless modem, a modem card, a laptop computer, etc. UE 110 may communicate with zero or more Node Bs on the downlink and uplink at any given moment. The downlink (or forward link) refers to the communication link from the Node Bs to the UE, and the uplink (or reverse link) refers to the communication link from the UE to the Node Bs.

Wireless network 100 may include other network entities such as those described by 3GPP. An access gateway 130 may couple to the Node Bs and provide coordination and control for Node Bs. Access gateway 130 may also support communication services for the UEs, (e.g., packet data), Voice-over-IP (VoIP), video, messaging, and/or other services. Access gateway 130 may be a single network entity or a collection of network entities. For example, access gateway 130 may comprise one or more Radio Network Controllers (RNCs), Serving GPRS Support Nodes (SGSNs), and Gateway GPRS Support Nodes (GGSNs), which are known in the art. Access gateway 130 may couple to a core network that may include network entities supporting various functions such as packet routing, user registration, mobility management, etc.

3GPP Release 5 and later supports High-Speed Downlink Packet Access (HSDPA). 3GPP Release 6 and 7 and later supports High-Speed Uplink Packet Access (HSUPA). HSDPA and HSUPA are sets of channels and procedures that enable high-speed packet data transmission on the downlink and uplink, respectively.

Figure 2:
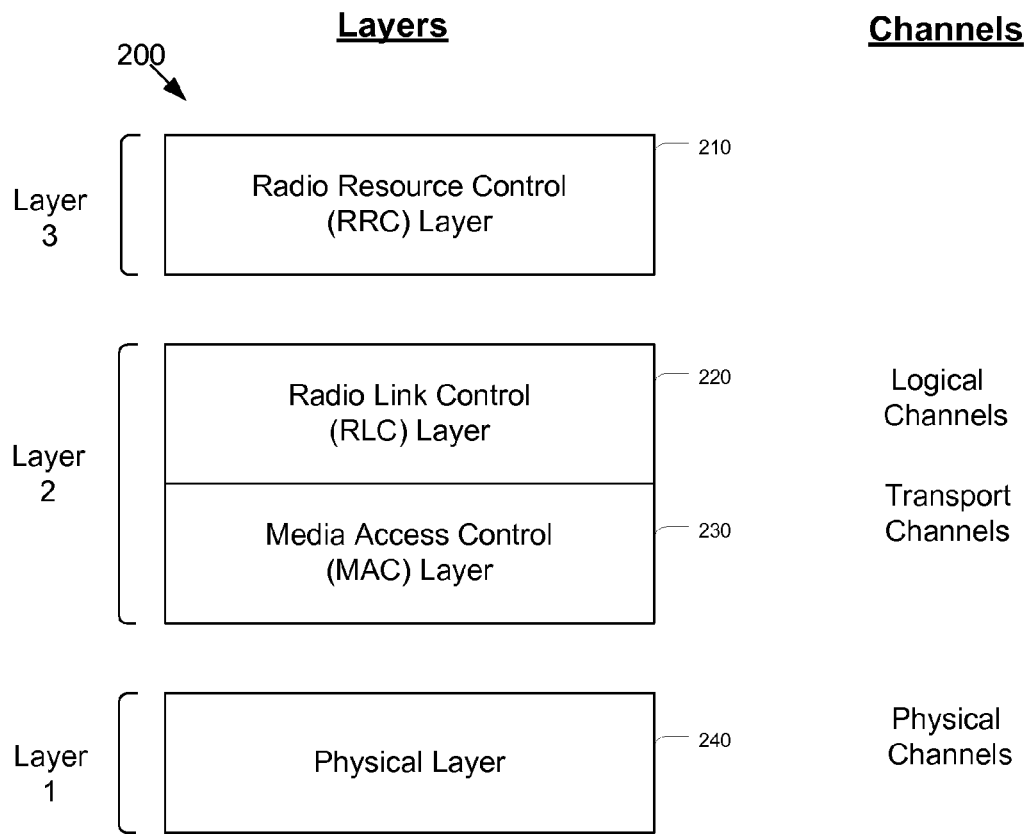
FIG. 2 illustrates a layer structure for data and signaling transmission.

FIG. 2 illustrates a layer structure 200 for 3GPP Release 6 and 7. Layer structure 200 includes a Radio Resource Control (RRC) layer 210, a Radio Link Control (RLC) layer 220, a Medium Access Control (MAC) layer 230, and a physical (PHY) layer 240. The RRC layer performs various functions for establishment, maintenance and termination of calls. The RLC layer provides various services to upper layers such as transparent data transfer, unacknowledged data transfer, acknowledged data transfer, maintenance of quality of service (QoS) as defined by upper layers, and notification of unrecoverable errors. The RLC layer processes and provides data in logical channels (e.g., a Dedicated Traffic Channel (DTCH) and a Dedicated Control Channel (DCCH)) for transfer of traffic data and signaling between UE 120 and the network.

The MAC layer provides various services to upper layers such as data transfer, reallocation of radio resources and MAC parameters, and reporting of measurements. The MAC layer includes various entities such as MAC-d, MAC-hs, and MAC-es. Other MAC entities are present in 3GPP Release 6 and 7 but are not shown in FIG. 2 for simplicity. MAC-d entity provides functionality such as transport channel type switching, multiplexing of logical channels to transport channels (C/T MUX), ciphering, deciphering, and uplink transport format combination (TFC) selection. MAC-hs supports HSDPA and performs functions such as transmission and retransmission (Hybrid Automatic Repeat/request-HARQ), reordering, and disassembly. MAC-es supports HSUPA and performs functions such as HARQ, multiplexing, and evolved TFC (E-TFC) selection. The MAC layer processes and provides data in transport channels (e.g., a Dedicated Channel (DCH), an Enhanced Dedicated Channel (E-DCH), and a High Speed Downlink Shared Channel (HS-DSCH)).

The physical layer provides mechanism for transferring data for the MAC layer and signaling for higher layers. The various layers in FIG. 2 are described in detail in 3GPP TS 25.301, entitled "Radio Interface Protocol Architecture," June 2007, and in 3GPP TS 25.321, entitled "Medium Access Control (MAC) protocol specification," June 2007, which are publicly available and incorporated herein by reference.

Referring to FIG. 2, data for UE 120 may be processed as one or more logical channels at the RLC layer. The logical channels may be mapped to MAC-d flows at the MAC layer. The MAC-d flows may also be referred to as QoS flows and may be multiplexed onto one or more transport channels. The transport channels may carry data for one or more services (e.g., voice, video, packet data, etc.). The transport channels are mapped to physical channels at the physical layer. The physical channels are channelized with different channelization codes and are orthogonal to one another in code domain.

Table 1 lists some physical channels in 3GPP Release 6 and 7, including physical channels for HSDPA and HSUPA.

TABLE 1

| | Channel | Channel Name | Description |
|---|---|---|---|
| | P-CCPCH | Primary Common Control Physical Channel | Carry pilot and system frame number (SFN). |
| | Uplink DPCCH | Dedicated Physical Control Channel | Carry pilot and control information on uplink. |
| | Uplink DPDCH | Dedicated Physical Data Channel | Carry data from a UE. |
| HSDPA | HS-SCCH (Downlink) | Shared Control Channel for HS-DSCH | Carry format information for packets sent on the HS-PDSCH. |
| | HS-PDSCH (Downlink) | High Speed Physical Downlink Shared Channel | Carry packets sent on the downlink for different UEs. |
| | HS-DPCCH (Uplink) | Dedicated Physical Control Channel for HS-DSCH | Carry ACK/NAK for packets received on the HS-PDSCH and channel quality indicator (CQI). |
| HSUPA | E-DPCCH (Uplink) | E-DCH Dedicated Physical Control Channel | Carry signaling for the E-DPDCH. |
| | E-DPDCH (Uplink) | E-DCH Dedicated Physical Data Channel | Carry packets sent on the uplink by a UE. |
| | E-HICH (Downlink) | E-DCH Hybrid ARQ Indicator Channel | Carry ACK/NAK for packets sent on the E-DPDCH. |
| | E-AGCH (Downlink) | E-DCH Absolute Grant Channel | Carry absolute grants of resources for the E-DPDCH. |
| | E-RGCH (Downlink) | E-DCH Relative Grant Channel | Carry relative grants of resources for the E-DPDCH. |

For HSUPA, the E-DPDCH is a physical channel used to carry the E-DCH transport channel. There may be zero, one, or several E-DPDCHs on a link between a UE and the wireless network. The E-DPCCH is a physical channel used to send control information associated with the E-DCH. There is at most one E-DPCCH on a link. The E-DPCCH and E-DPDCH are control and data channels, respectively, for high rate data in HSUPA. The E-HICH is a fixed rate dedicated downlink physical channel carrying acknowledgements (ACKs) and negative acknowledgements (NAKs) for packets sent on the E-DPDCH.

The E-AGCH and E-RGCH are grant channels used for resource control in HSUPA and are also referred to as E-DCH control channels. The E-AGCH is a fixed rate downlink physical channel carrying absolute grants for the E-DPDCH. For HSUPA, the E-DPDCH is configured ahead of time, and an absolute grant indicates an amount of transmit power that a UE may use for the E-DPDCH. A grant is valid for an indefinite period of time until it is modified or revoked. The E-RGCH is a fixed rate downlink physical channel carrying relative grants for the E-DPDCH. A relative grant indicates a change from the current grant, e.g., an increase or decrease of the current grant by some amount. In general, a grant channel is a channel used to convey grants of wireless network, also known as radio resources, for a link. The radio resources may be quantified by time, frequency, code, transmit power, etc., or any combination thereof.

One challenge in wireless communication systems is to provide efficient data transmission while minimizing power consumption in a UE. Furthermore, packet data transmissions in particular are characterized by "burstiness" of the traffic data to be transferred over the wireless network. Specifically, time intervals where large amounts of data need to be transmitted alternate with time intervals where a very small amount of data or no data at all need to be transmitted. Since variations in traffic volume are consistent with UMTS configurations, the present embodiments will be described with reference to its use in a Wideband Code Division Multiple Access (WCDMA) wireless network, although it will be appreciated that the same principle may be applied in other networks.

Accordingly, continuously maintaining a physical link between a UE and the wireless network, even when no UE data actually needs to be transmitted, leads to needless continuous power consumption at the UE. Conversely, maintenance of the physical link guarantees that, if new UE data arises, the UE data can be transferred immediately without additional delay. Understandably, maintenance of a channel is therefore favored. Accordingly, there are two main approaches to enable power saving in the UE.

One possibility is to use channel type switching by transmitting and receiving low-volume traffic on common channels, while transmitting and receiving high-volume traffic on dedicated channels. One drawback is the need to perform new link synchronization before each transmission on a common channel and a dedicated channel. A second possibility includes performing "discontinuous" transmission and reception on dedicated channels. One common discontinuous approach is referred to as "DPCCH Discontinuous transmission and reception (DPCCH DTRX)".

The purpose of DPCCH DTRX is to switch transmission and reception on the Dedicated Physical Control Channel (DPCCH) off, into a "sleep or idle mode" for a number of radio frames, in both the UE and the network. At regular intervals, called Discontinuous Transmission periods ("DTX periods") transmitters and receivers wake-up and perform re-synchronization of the physical link.

Figure 3:
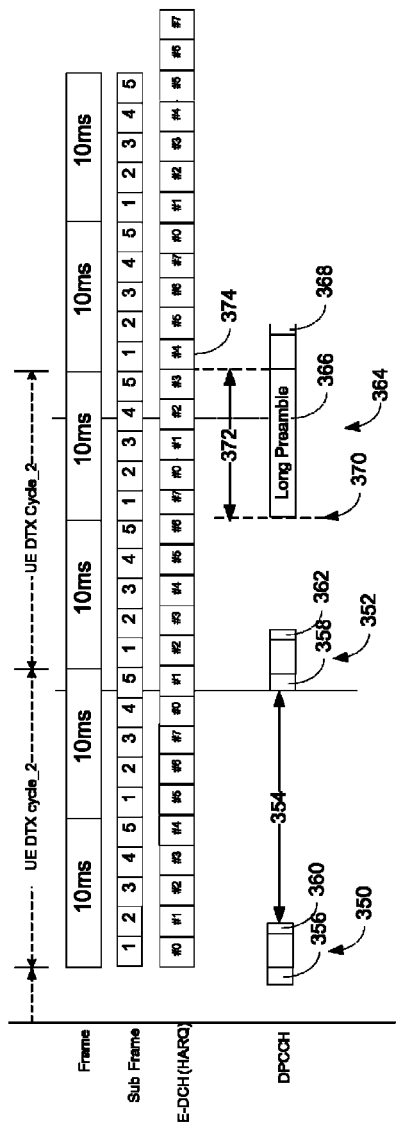
FIG. 3 illustrates a framing sequence of various transmission signals in accordance with various embodiments.

FIG. 3 illustrates a framing sequence of various signals in accordance with various embodiments. When no dedicated channels (DCHs) and no corresponding dedicated physical data channels (DPDCHs) are configured in an uplink, all data is transmitted on an enhanced dedicated channel (E-DCH) which is mapped to an enhanced dedicated physical data channel (E-DPDCH) with control signaling associated with the E-DCH being transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., an uplink high speed dedicated physical control channel, HS-DPCCH) for an HS-DSCH (high speed downlink shared channel) may be transmitted.

The uplink DPCCH carries control information generated at layer 1 (physical layer). The layer 1 control information may consist of, for example, known pilot bits to support channel estimation for coherent detection, transmit power control (TPC) for downlink DPCH (dedicated physical channel), optional feedback information (FBI) and optional transport format combination indicator (TFCI). Typically, the uplink DPCCH is continuously transmitted (even if there is no data to be transmitted for certain time periods), and there is one uplink DPCCH for each radio link. While continuous transmission may occur for a continuous flow of data, continuous DPCCH transmission results in a significant overhead for bursty data flow.

The uplink capacity can be increased by decreasing the control overhead. One possibility for decreasing the control overhead is uplink DPCCH "gating" (or discontinuous transmission) (i.e., not continuously transmitting signals on the DPCCH). Rationale for using gating includes (but is not limited to): providing user equipment (UE) power savings and longer battery life; providing interference reduction; and providing higher capacity.

As illustrated in FIG. 3, the E-DCH transmission in the uplink is discontinuous during a reading time, such that during most of the reading time there is no E-DCH transmission. Note, that depending on the packet arrival intervals (among other things), there may be gaps in the E-DCH) transmission during a packet session but the E-DCH transmission might also be continuous during the packet session.

Also, a signal on a high speed dedicated physical control channel (HS-DPCCH) can be transmitted in an uplink direction from a UE to the network. The HS-DPCCH signal typically carries 2 slots with channel quality indicator (CQI) reporting information and 1 slot with ACK/NACK information for the HSDPA. CQI transmission is typically periodic and normally independent of the HS-DSCH transmission activity. CQI reporting period can be controlled by a radio network controller (RNC) with possible values of 0, 2, 4, 8, 10, 20, 40, 80, and 160 ms. ACK/NACK is transmitted only as a response to a packet transmission on the HS-DSCH, which (similar to the E-DCH) is transmitted only when there is data to be transmitted and which depends on the reading time and packet arrival times during the packet session.

For the E-DCH transmission, a grant is needed, such as either a non-scheduled grant for non-scheduled MAC-d flows or a serving grant (and allowed active HARQ process) for a scheduled transmission. In the example of scheduled MAC-d flows, a Node B controls when a UE is allowed to transmit which results in Node B knowing when the UE may send data. For non-scheduled MAC-d flows, the network can allow a maximum number of bits that can be included in a MAC-e PDU (protocol data unit) for the given MAC-d flows. In an example of a 2 ms E-DCH transmission timing interval (TTI), each non-scheduled grant is applicable for a specific set of HARQ processes indicated by an RRC (radio resource control), and RRC can also restrict the set of HARQ processes for which scheduled grants are applicable.

As stated, reduction in DPCCH overhead of packet data may occur by turning off the DPCCH transmission when no data or HS-DPCCH is being transmitted. Accordingly, UEs would not consume any uplink air interface resources and the network resource allocation would set the limit on how many idle UEs could be maintained. However, due to practical reasons there may be a limit on the length of the DPCCH gating period, since during a period of long UE inactivity, the Node B would not know whether the uplink UE synchronization was lost, or if there is just a long inactivity period.

The basic principle is that if there is neither an E-DCH nor a HS-DPCCH transmission, the UE automatically stops the continuous DPCCH transmission and instead applies a known DPCCH activity (DPCCH on/off) pattern (i.e., a gating pattern) as illustrated in FIG. 3. When an E-DCH or HS-DPCCH transmission takes place the DPCCH is also transmitted regardless of the activity pattern. That is, during a period of E-DCH and HS-DPCCH inactivity the UE would activate a known DPCCH transmission pattern (i.e., a gating pattern), such as a few DPCCH slots 350, 352 transmitted every few radio frames, and no DPCCH transmission is made during other times. If E-DCH or HS-DPCCH is transmitted the DPCCH would be transmitted normally regardless of the pattern. Depending on the length of the DPCCH transmission gap 354, a DPCCH control preamble 356, 358 of a few slots and postambles 360, 362 may be needed before E-DCH/HS-DPCCH transmission may start. Reception of the downlink HS-SCCH/HS-PDSCH would be active and possible at all times for the UE. During the periods when the uplink DPCCH is not transmitted, the Node B will not be able to perform uplink SIR estimation, and thus has no information on which to base the uplink TPC commands sent on F-DPCH. Therefore, the F-DPCH may also be gated during the periods of uplink DPCCH gating.

The uplink discontinuous mode (DTX) allows an autonomous reduction of uplink DPCCH transmissions in the UE depending on how often E-DCH and HS-DPCCH transmissions in the uplink occur. This mechanism is under control of the network by standardized rules whose parameters are configured in the RNC. Two different forms of discontinuous uplink DPCCH preamble transmissions have to be distinguished for a UE applying uplink DTX. First, a preamble 356, 358 are applied to uplink DPCCH signals 350, 352. However, if there has not been any E-DCH transmission for an inactivity threshold duration and if a UE will start a transmission of E-DPCCH and E-DPDCH on an E-DCH transmission time interval (TTI), then the UE starts the DPCCH transmission 364 with a long preamble 366 and includes a postamble 368.

The long preamble 366 is started at a long preamble decision point 370 which is at least an equivalent number of slots in duration of the length of the long preamble 372 prior to the beginning of any E-DCH transmission. The DPCCH transmission 364 continues during the E-DCH TTI 374 and further continues one slot after the last consecutive E-DCH TTI. The long preamble 366, for example, can be either four time slots or five time slots depending on the configuration while a typical preamble 356, 358 is one or two slots in length. It is noted that the transmission of long preamble 364 consumes more power for transmission than either of preambles 356, 358. Further details are described in 3GPP Technical Specifications TS25.214/TS25.321/TS25.331 (Release 7) available at www.ETSI.org, incorporated herein by reference.

Accordingly, if a UE includes data for transmission on the uplink, then the UE prepares for transmission in an upcoming HARQ process (i.e., corresponding TTI) including the required transmission of the long preamble (up to 15 slots) prior to the HARQ transmission. During the long preambles, the UE performs a serving grant update, E-TFCI selection, MAC-es PDU packaging, etc. One undesirable outcome of the serving grant update is that the serving grant update procedure concludes that the upcoming HARQ process is deactivated in spite of the in-process transmission by the UE of the long preamble 366. The deactivation of a HARQ process for a TTI (e.g., 2 msec. slot) may occur through an INACTIVE value of the absolute grant. If the deactivation of the HARQ process occurs during the long preamble transmission, the power expended by the UE for transmitting the long preamble was waste and an unnecessary rise of thermal (RoT) in the uplink has occurred which further reduces the uplink capacity.

Accordingly, the various embodiments provide a method and apparatus for reducing unnecessary transmissions of a long preamble when network conditions indicate a likelihood that a forthcoming HARQ process will not occur. Stated another way, the UE determines to transmit uplink DPCCH long preambles only when the confidence level is sufficient that the HARQ process is likely to not be deactivated.

The method and apparatus provide for optimization and improvement to prediction factors relating to HARQ deactivation during transmission of a long preamble for the DPCCH signal. In order to optimize the uplink discontinuous (DTX) E-DCH transmission, prior to the long preamble decision point 370, the UE takes into account these prediction factors including recent past performance or history to determine whether the DPCCH long preamble should be initiated or delayed. The optimization process defines the following variables:

LP=Long preamble token
BUF=Whether the UE buffer has data to be sent or not (0 or 1)
Pri=MAC-d flow Priority of the buffer that has data to be sent
Vol=Quantized data volume in the buffer
NACK=The average number of E-DCH HARQ NACK or ACK that have been received over the last T ms (where T is configurable depending on UE_DTX_Cycle_2)
GRANT=The average GRANT value that have been received over the last T ms (where T is configurable depending on UE_DTX_Cycle_2)
$\alpha, \beta, \chi$, and $\omega$=Weighting factors
BUF={0,1}

And the UE computes LP for each possible E-DCH TTI as follows.

$$LP = BUF * (\mu * \text{Data} + \chi * NACK + \omega * GRANT) \qquad \text{Equation 1}$$

Where $$\mu + \chi + \omega = 1$$

$$\text{Data} = \sum_{x=1}^{N} (\alpha * Pri(x) + \beta * Vol(x))$$

$$\alpha + \beta = 1$$

N is the maximum number of

-continued

MAC-d flows. For example, N = 8.

$$NACK = \left(\gamma * \sum_{n1} NACK_{cur\_srv\_cell} + \eta * \sum_{n2} NACK_{pre\_srv\_cell}\right)$$

$\gamma + \eta = 1$ $NACK_{cur\_srv\_cell} =$ the $n1$ NACK received from the current serving cell.

$NACK_{pre\_srv\_cell} =$ the $n2$ NACK received from the previous serving cell.

After having computed the LP, the UE determines
(1) If LP≥LP$_{threshold}$, then the UE starts UL DPCCH long preamble of a "Long_Preamble_Length" prior to the HARQ process. The UE implementation; the MAC layer informs the Layer 1 to send UL DPCCH long preambles.
(2) If LP<LP$_{threshold}$, then the UE doesn't start UL DPCCH long preamble. The upcoming HARQ transmission will not occur. The data transmission in the buffer will be postponed. The UE implementation; the MAC layer informs the Layer 1 NOT to send UL DPCCH long preambles. Alternatively, if the long preamble has already commenced, the UE MAC may send a message such as an "ABORT LONG PREAMBLE" control message to Layer 1 to abort an underway transmission of the long preamble resulting from a determination of favorable conditions.
where LP$_{threshold}$ is the threshold of long preamble token and is configurable.

The above embodiment occurs when there is data in the buffer, that is when BUF=1. This will avoid needlessly expending UE power for unnecessary computation. However, this present embodiment doesn't preclude other implementations, for example, of conducting the above embodiment at every frame boundary.

The following define the prediction factors used in the above equations: BUF is a factor in Equation 1. BUF indicates whether the UE buffer has data to be sent or not (0 or 1). At every frame boundary as shown in FIG. 3, the UE checks whether there is data in the buffer to be sent. If there is data, the UE sets BUF=1, otherwise sets it to 0. When BUF=0, there will be neither DPCCH long preamble nor E-DCH transmission in the upcoming HARQ process (but the uplink DPCCH short preamble still occurs according to ULE DTX cycle definitions and configuration). When BUF=1, the determination process for long preamble takes place according to Equation 1.

Pri is MAC-d flow Priority of the buffer that has data to be sent. If there are multiple buffers having data to be sent, the highest priority will be examined. Normalization of the priority is needed. In addition to MAC-d flow priority, the priority can be the service/application priority. The UE can map the MAC-d flow priority to service/application priority. Pri is a factor to dictate the importance and emergency of data to be transmission.

Vol is the quantized (or normalized) data volume from the entire buffers at UE. Data accumulated and from previous DTX cycles are also taken into account.

NACK is the average number of E-DCH HARQ NACKs or ACKs that have been received over the last T msec. T is configurable, for example, depending on UE_DTX_Cycle_2. The longer UE_DTX_Cycle_2, the longer T. NACK is a factor to indicate the uplink channel condition in a long run. When the condition is not efficiently good, the UE may start uplink DPCCH long preambles conservatively; otherwise, aggressively. NACK may be averaged over a period of time. The value of NACK may be normalized. NACK may be a weighted sum of the counts obtained in the current cell and that obtained in the previous serving cell.

GRANT is the average Serving Grants over the last T2 msec. T2 is configurable depending on UE_DTX_Cycle_2. The longer UE_DTX_Cycle_2, the longer T2. GRANT is a factor to indicate the system resource condition in a long run. When the condition is not efficiently good, the UE may start uplink DPCCH long preambles conservatively; otherwise, aggressively. GRANT may be a weighted average over a period of time, taking into account that the more recent factors better correspond to the current network situation.

Figure 4:
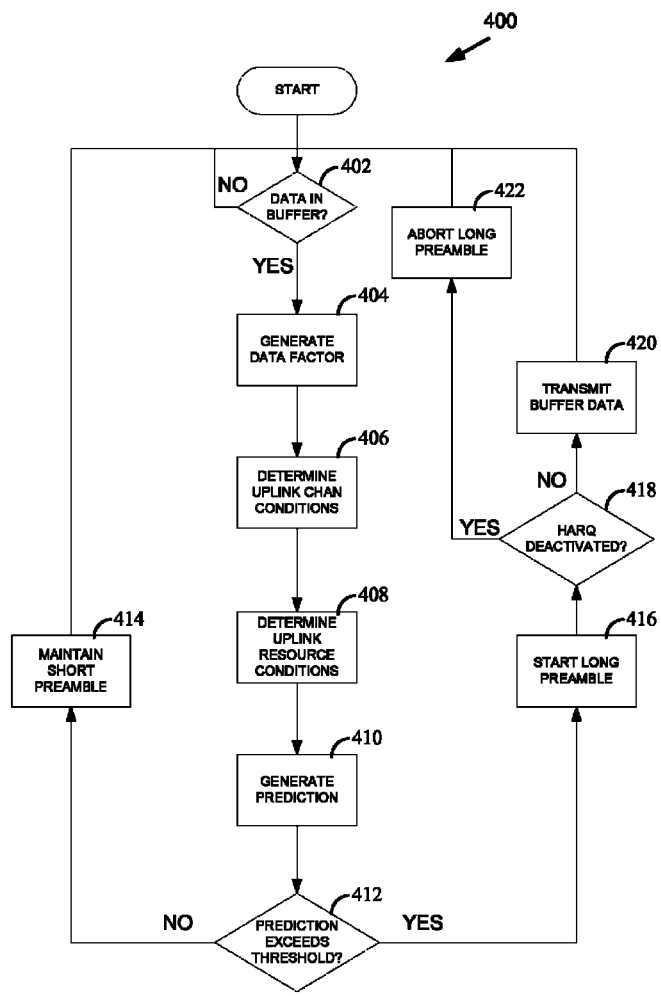
FIG. 4 is a flowchart of a method for transmitting data in an uplink, in accordance with various embodiments.

For example, one embodiment could be that the average GRANT is calculated as a exponentially weighted average of the previous N GRANT values:

$$\overline{GRANT} = \sum_{i=0}^{N} GRANT(i) \cdot a^i$$

where α is the weighting coefficient, 0<α<1.
The value of GRANT may be normalized. GRANT could further be a weighted sum of the counts obtained in the current cell and that obtained in the previous serving cell FIG. 4 is a flowchart of a method for transmitting data in an uplink, in accordance with various embodiments. The method 400 reduces transmitting control signals, namely a long preamble of multiple slots, on a control channel when network conditions and resources indicate a likelihood that the data transmission will be blocked or deactivated. Specifically in one embodiment, the likelihood is based on the HARQ process for transmitting the data concluding without being deactivated. A query 402 determines if Data is present in a buffer in memory 532 (FIG. 5) for transmission during a discontinuous transmission (DTX) mode. When Data is present (Buf=1), a data factor is calculated 404 based in part on the priority Pri and volume Vol of data in the buffer.

The process also determines 406 the uplink channel conditions over a recent history. One specific indicator of uplink channel conditions is the NACK factor identified above which is an average of the number of E-DCH HARQ NACKs or ACKs that have been received over the last T msec. The process also determines 408 uplink system resource conditions. One specific indictor of uplink system resource conditions is the GRANT factor identified above which is the average Serving Grants over the last T2 msec.

A prediction factor LP is generated 410 which is a prediction of the likelihood of completing the transmission of data from the buffer over the uplink without interruption. The prediction factor LP is compared 412 against a LP$_{threshold}$. When the prediction LP does not exceed the threshold, then a short preamble is maintained 414 in order to continue maintenance of the uplink in discontinuous (DTX) mode. When the prediction LP exceeds LP$_{threshold}$, then transmission 416 of the long preamble is started with monitoring 418 of the HARQ process. If the HARQ process is not deactivated, then data is transmitted 420 over the E-DCH. However, if the HARQ process is deactivated, then the long preamble is aborted 422.

Figure 5:
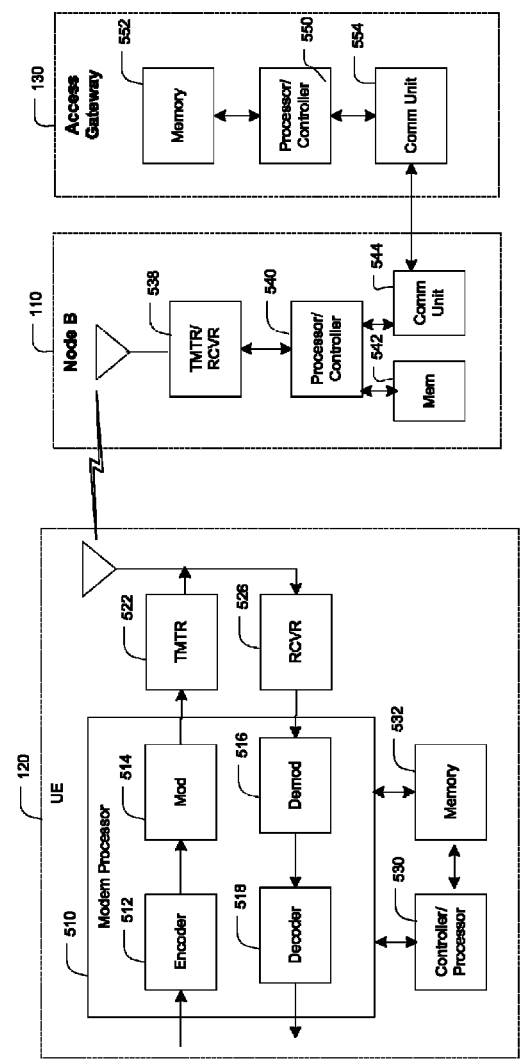
FIG. 5 illustrates a block diagram of an apparatus, such as a UE, for transmitting data on an uplink, in accordance with various embodiments.

FIG. 5 shows a block diagram of a UE 120. On the uplink, an encoder 512 may receive data and signaling to be sent by UE 120 on the uplink. Encoder 512 may process (e.g., format, encode, and interleave) the data and signaling. A modulator (Mod) 514 may further process (e.g., modulate, channelize, and scramble) the encoded data and signaling and provide output chips. A transmitter (TMTR) 522 may condition (e.g., convert to analog, filter, amplify, and frequency upconvert) the output chips and generate an uplink signal, which may be transmitted via an antenna 524 to the Node Bs.

On the downlink, antenna 524 may receive downlink signals transmitted by Node B 110 and other Node Bs. A receiver (RCVR) 526 may condition (e.g., filter, amplify, frequency downconvert, and digitize) the received signal from antenna 524 and provide samples. A demodulator (Demod) 516 may process (e.g., descramble, channelize, and demodulate) the samples and provide symbol estimates. A decoder 518 may further process (e.g., deinterleave and decode) the symbol estimates and provide decoded data. Encoder 512, modulator 514, demodulator 516, and decoder 518 may be implemented by a modem processor 510. These units may perform processing in accordance with the radio technology (e.g., W-CDMA) used by the wireless network.

A controller/processor 530 may direct the operation of various units at UE 120. Controller/processor 530 may implement process 400 in FIG. 4 and/or other processes for monitoring grant channels. Memory 532 may store program codes and data for UE 120.

FIG. 5 also shows a block diagram of Node B 110 and access gateway 130 in FIG. 1. Node B 110 may be any of the Node Bs shown in FIG. 1. For Node B 110, a transmitter/receiver 538 may support radio communication with UE 120 and other UEs. A processor/controller 540 may perform various functions for communication with the UEs. Memory (Mem) 542 may store program codes and data for Node B 110. A communication (Comm) unit 544 may support communication with access gateway 130. For access gateway 130, a processor/controller 550 may perform various functions to support communication services for the UEs. Memory 552 may store program codes and data for Node B 110. A communication unit 554 may support communication with Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of transmitting data on an uplink, comprising:
    tracking past performance including recent history at a user equipment (UE) of at least one of an uplink channel condition and uplink system resources determined at the UE, wherein, the uplink system resources comprises a past performance of grants of wireless network resources over the uplink during a defined time period;
    predicting a likelihood of a completed data transmission based on the past performance comprises predicting when data to be transmitted is present;
    weighting the prediction based on a priority value of the data; and
    transmitting from the UE a long preamble with an uplink control channel when the prediction exceeds a threshold.

2. The method of claim 1, wherein the uplink channel conditions include a past performance of positive or negative acknowledgements of previous data transmissions over the uplink during a defined time period.

3. The method of claim 1, further comprising weighting the prediction based on a volume value of the data.

4. The method of claim 1, wherein transmitting a long preamble further comprises aborting transmission of the long preamble when the prediction ceases to exceed the threshold.

5. The method of claim 1, further comprising transmitting a short preamble with an uplink control channel when the prediction does not exceed the threshold.

6. The method of claim 1, wherein the uplink control channel is a Dedicated Physical Control Channel (DPCCH) in a 3rd Generation Partnership Project (3GPP) system.

7. The method of claim 1, wherein the long preamble is one of four, seven or fifteen transmission timing intervals (TTIs) in duration.

8. An apparatus for transmitting data on an uplink, comprising:
    at least one processor to track past performance including recent history at a user equipment (UE) of at least one of an uplink channel condition and uplink system resources determined at the UE, to predict a likelihood of a completed data transmission based on the past performance, wherein, the prediction is made when data to be transmitted is present and to weight the prediction based on a priority value of the data; and,
    a memory to store a past performance of grants of wireless network resources over the uplink during a defined time period; and
    a transmitter to transmit from the UE a long preamble with an uplink control channel when the prediction exceeds a threshold.

9. The apparatus of claim 8, further comprising a memory to store the uplink channel conditions including a past performance of positive or negative acknowledgements of previous data transmissions over the uplink during a defined time period.

10. The apparatus of claim 8, wherein the at least one processor weights the prediction based on a volume value of the data.

11. The apparatus of claim 8, wherein the transmitter aborts transmission of the long preamble when the prediction ceases to exceed the threshold.

12. The apparatus of claim 8, wherein the transmitter further transmits a short preamble with an uplink control channel when the prediction does not exceed the threshold.

13. An apparatus for transmitting data on an uplink, comprising:
    means for tracking past performance including recent history at a user equipment (UE) of at least one of an uplink channel condition and uplink system resources determined at the UE wherein, the uplink system resources comprises a past performance of grants of wireless network resources over the uplink during a defined time period;
    means for predicting a likelihood of a completed data transmission based on the past performance comprises predicting when data to be transmitted is present;
    means for weighting the prediction based on a priority value of the data; and
    means for transmitting from the UE a long preamble with an uplink control channel when the prediction exceeds a threshold.

14. The apparatus of claim 13, wherein the uplink channel conditions include a past performance of positive or negative acknowledgements of previous data transmissions over the uplink during a defined time period.

15. The apparatus of claim 13, further comprising means for weighting the prediction based on a volume value of the data.

16. The apparatus of claim 13, wherein the means for transmitting a long preamble further comprises means for aborting transmission of the long preamble when the prediction ceases to exceed the threshold.

17. The apparatus of claim 13, further comprising means for transmitting a short preamble with an uplink control channel when the prediction does not exceed the threshold.

18. A non-transitory processor-readable medium including processor-executable instructions for performing a method of transmitting data on an uplink, the method comprising the steps of:
    tracking past performance including recent history at a user equipment (UE) of at least one of an uplink channel condition and uplink system resources determined at the UE wherein, the uplink system resources comprises a past performance of grants of wireless network resources over the uplink during a defined time period;
    predicting a likelihood of a completed data transmission based on the past performance comprises predicting when data to be transmitted is present;
    weighting the prediction based on a priority value of the data; and
    transmitting from the UE a long preamble with an uplink control channel when the prediction exceeds a threshold.

19. The non-transitory processor-readable medium of claim 18, wherein the uplink channel conditions include a past performance of positive or negative acknowledgements of previous data transmissions over the uplink during a defined time period.

20. The non-transitory processor-readable medium of claim 18, further comprising processor-executable instructions for weighting the prediction based on a volume value of the data.

21. The non-transitory processor-readable medium of claim 18, wherein the processor-executable instructions for transmitting a long preamble further comprise processor-executable instructions for aborting transmission of the long preamble when the prediction ceases to exceed the threshold.

* * * * *